(12) United States Patent
Zwick

(10) Patent No.: US 6,978,013 B1
(45) Date of Patent: Dec. 20, 2005

(54) DEVICE FOR ESTABLISHING A GALVANICALLY SEPARATE CONNECTION BETWEEN A TELEPHONE LINE AND A SIGNAL PROCESSING UNIT AT THE SUBSCRIBER END OF THE TELEPHONE LINE

(75) Inventor: Herm Thomas Zwick, Hohenkirchen-Siegertsbrunn (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/786,897

(22) PCT Filed: Sep. 14, 1999

(86) PCT No.: PCT/DE99/02911

§ 371 (c)(1),
(2), (4) Date: May 24, 2001

(87) PCT Pub. No.: WO00/19689

PCT Pub. Date: Apr. 6, 2000

(30) Foreign Application Priority Data

Sep. 30, 1998 (DE) .......................................... 198 45 123

(51) Int. Cl.[7] .......................... H04M 1/00; H04M 9/00; H40M 9/08
(52) U.S. Cl. ....................................... 379/412; 379/402
(58) Field of Search ............................ 379/391, 376.02, 379/399.01, 412, 402, 405, 414

(56) References Cited

U.S. PATENT DOCUMENTS

| | | | |
|---|---|---|---|
| 4,679,115 A | | 7/1987 | Connan et al. |
| 5,870,046 A | * | 2/1999 | Scott et al. .................. 341/143 |

FOREIGN PATENT DOCUMENTS

| | | |
|---|---|---|
| EP | 0 622 899 | 11/1994 |
| EP | 0 576 882 | 4/1997 |

* cited by examiner

Primary Examiner—Curtis Kuntz
Assistant Examiner—Alexander Jamal
(74) Attorney, Agent, or Firm—Welsh & Katz, Ltd.

(57) ABSTRACT

A device for the DC-decoupled connection of a telephone line to a signal processing device at the subscriber end of the telephone line is disclosed. The device exhibits a first circuit which is connected to the telephone line, a second circuit which is connected to the signal processing device, and a transformer which exhibits a first and a second winding, the first winding being connected to the first circuit and the second winding being connected to the second circuit and the first and second winding being DC-decoupled from one another. The device is characterized by the fact that the first circuit exhibits a hybrid circuit for separating the signals of the telephone line into a first signal path which extends from the telephone line to the signal processing device, and into a second signal path which extends from the signal processing device to the telephone line.

7 Claims, 2 Drawing Sheets

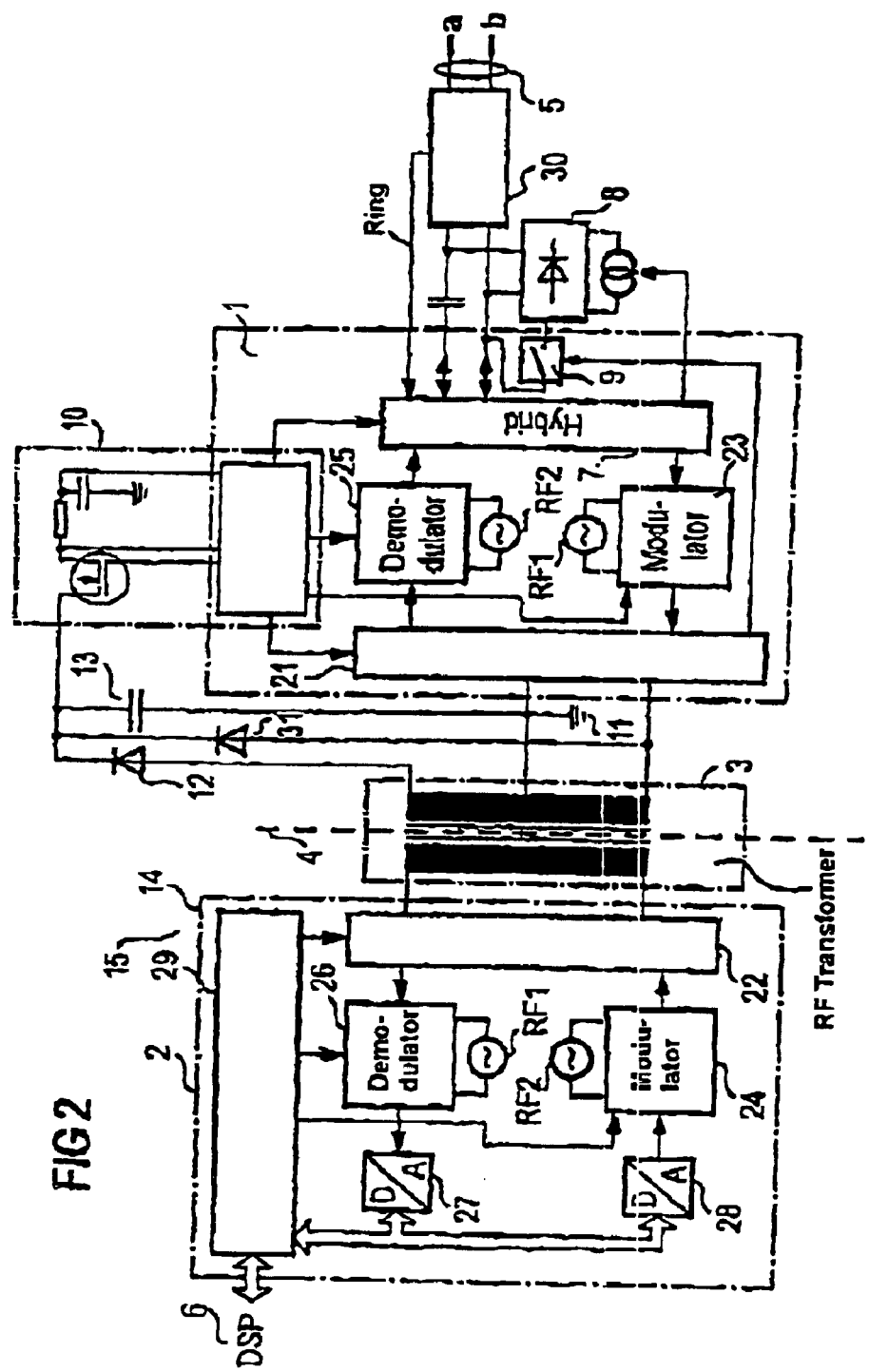

Figure 1:
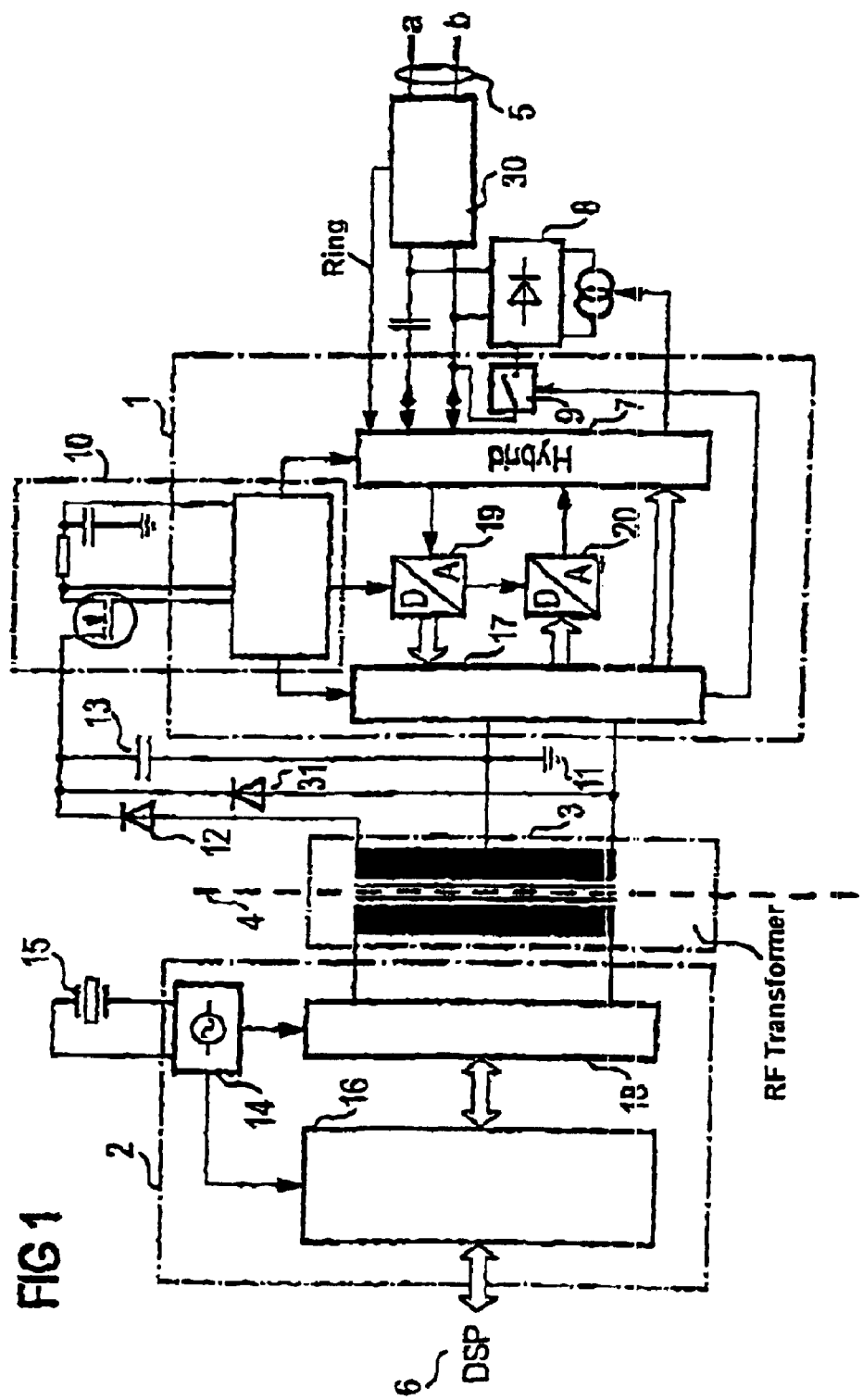

DEVICE FOR ESTABLISHING A GALVANICALLY SEPARATE CONNECTION BETWEEN A TELEPHONE LINE AND A SIGNAL PROCESSING UNIT AT THE SUBSCRIBER END OF THE TELEPHONE LINE

This application is based on PCT application No. PCT/DE99/02911.

The invention relates to a device for the DC-decoupled connection of a telephone line to a signal processing device at the subscriber end of the telephone line.

From EP-A-0 576 882 a device for the DC-decoupled connection of a telephone line to a signal processing device at the subscriber end of a telephone line is known which exhibits a first circuit which is connected to the telephone line and which exhibits a second circuit which is connected to the signal processing device. In this known device, a hybrid circuit for separating the signals of the telephone line into a first signal path which extends from the telephone line to the signal processing device, and into a second signal path which extends from the signal processing device to the telephone line, is provided.

The received integrated analog signal of the telephone line is digitized in the first circuit, multiplexed and transmitted via a first transformer to the second circuit where it is de-multiplexed. The received signal of the second circuit is digitized, multiplexed and transmitted via a second transformer to the first circuit where it is de-multiplexed.

WO 93/39907 A discloses a transformerless data access arrangement for transferring data between a high-speed modem and a telephone line.

U.S. Pat. No. 5,473,552 discloses an arrangement for isolating a computer system from a data transmitter network, in which a circuit is fed from a transformer.

WO 96/04715 A discloses a line interface and a method for isolating a data terminal from the line, the signals transmitted via an isolation circuit being modulated and demodulated and, respectively, mixed.

EP-A-0 661 862 discloses a coupling device for providing for communication between a signal processing device and a telephone network comprising an infrared transformer and receiver and a sigma/delta coder.

Conventional analog telephone subscriber lines are frequently also used as data transmission medium. For this purpose, the subscribers are the available capabilities of the analog voice telephone network for exchanging data with one another. At the respective subscriber end of the telephone subscriber lines, data sources and data sinks which send data to a remote subscriber or, respectively, receive data from a remote subscriber are arranged for this purpose. As a rule, the data sources and data sinks are conventional computers to which a transmitting device and a receiving device in the form of a modem (modulator/demodulator) are connected. The modem and the computer are connected to a power supply which is independent of the telephone line at the subscriber end.

The rules of the operators of analog telephone networks demand that the terminals connected by a subscriber to the subscriber end of the two-wire telephone line remain DC-decoupled from a local earth potential. With respect to the telephone network, a modem represents such a terminal which must meet these requirements. A modem requires, therefore, a circuit which, on the one hand, ensures bi-directional signal communication via the telephone line and on the other hand, ensures DC-decoupling from the telephone line. Such circuits are also called DATA Access Arrangements (DAA).

Conventional concepts for DC-decoupling are based on transformers, in which a winding of the transformer forms the line termination at the subscriber end of a telephone line. However, transformers have the disadvantage that they have a large volume relative to other components of the modem in the voice frequency range and have a relatively large statistical variation in their electrical characteristics. A statistical variation of the electrical characteristics must be compensated for by complex circuits in the modem.

A circuit arrangement for coupling an analog transmission path to a digital transmission path has become known from EP 0 798 885. The analog transmission path could represent an analog telephone line and the digital transmission path could represent a digital data bus within a modem. The circuit arrangement provides alternatively capacitors and opto-couplers as DC-decoupling elements. However, the use of opto-couplers is avoided in many applications because they are relatively expensive in comparison with the other components. The use of capacitors as DC-decoupling elements is advantageous in principle but the implementation of this concept reveals that a pair of capacitors must be provided for each direction of transmission in order to ensure reliable data transmission via the isolation boundary. As a rule, therefore, at least four capacitors (two capacitors for each direction of transmission) are provided in the implementation of the capacitive decoupling concept. This large number of components is undesirable for production reasons. In addition, such a circuit is found to be sensitive to common-mode interference on the telephone line.

The technical problem of the invention, therefore, consists in specifying a device for the DC-decoupled connection of a telephone line to a signal processing device which can be produced inexpensively and can manage with a small number of components.

The problem is solved by means of a device having the features of claim 1. Advantageous embodiments of this device are found in the sub-claims.

The device according to the invention uses a transformer for DC-decoupling. In this arrangement, however, the transformer is not directly connected to the telephone line but is only located behind a hybrid circuit which separates the signals of the telephone line into a first signal path and a second signal path for the respective directions of transmission. Since the signals of the telephone line can be represented in a different way, especially in a higher frequency range, behind the hybrid circuit, it is possible to dimension the transformer differently i.e., the transformer volume can be made smaller. In such a frequency range, statistical variations of the transformer are scarcely significant and do not, therefore, need to be taken into consideration.

In a first preferred illustrative embodiment, the signals of the telephone line behind the hybrid circuit are supplied to a high-speed digital/analog converter or, respectively, analog/digital converter before the signals thus obtained are supplied to the transformer. In an alternative illustrative embodiment, the signals of the telephone line are demodulated by a radio-frequency demodulator and respectively, modulated by a radio-frequency modulator behind the hybrid circuit. Modulation and demodulation is preferably at a different frequency for the two directions of transmission.

The circuit section which is DC-coupled to the telephone line preferably exhibits a power supply device which is alternatively fed from the telephone line or from the transformer. Feeding from the transformer is especially advantageous because this can be ensured with relatively simple means and is not subject to the fluctuations of the power supply of analog telephone lines.

Further advantages, features and possible applications of the invention are obtained from the subsequent description of the illustrative embodiments in conjunction with the diagrammatic drawing in which:

FIG. 1 shows a first illustrative embodiment of the device according to the invention; and FIG. 2 shows a second illustrative embodiment of the device according to the invention.

In the illustrative embodiment of FIG. 1, a transformer 3 which ensures the DC-decoupling between the subscriber end of an analog telephone line 5 and a signal processing device 6 in the form of a DSP (Digital Signal Processor) is shown as a DC-decoupling element. Line 4 symbolizes the isolation barrier which extends through the transformer 3 and over which signals are exchanged. The transformer 3 has a winding on each side of the isolation barrier 4. A primary winding is on the side of the telephone line 5 and a secondary winding is on the side of the signal processing device 6. The windings of the transformer 3 are magnetically coupled to one another.

The primary winding is connected to a circuit 1. The circuit 1 exhibits an hybrid circuit 7 which is connected to the subscriber end of the analog telephone line 5. The hybrid circuit 7 performs a two-wire/four-wire conversion and provides at the four-wire end a signal output and a signal input which correspond to the directions of transmission between the signal processing device 6 and the remote end of the telephone line 5. In the first direction of transmission from the analog telephone line 5 to the transformer 3, an analog/digital converter 19 which samples the analog signal arriving from the telephone line 5 at a high sampling rate and outputs the sampled signal values in the form of digital signals is connected downstream of the hybrid circuit 7. In the reverse direction, a digital/analog converter 20 is provided which converts the digital signals coming from the signal processing device 6 into analog signals in order to output them to the telephone line 5 via the hybrid circuit 7. The analog/digital converter 19 and the digital/analog converter 20 are connected to a digital signal multiplexer 17 which, in turn, is connected to two winding taps off the primary winding of the transformer 3. The digital signal multiplexer 17 operates in time-division multiplex in both directions of transmission, i.e. it alternately sends signals to the transformer 3 or receives signals from the transformer 3 in a ping-pong process.

Opposite the circuit 1, a circuit 2 is located on the other side of the isolation barrier 4. This circuit 2 is connected to a transformer 3 on the one hand and, on the other hand, to a signal processing device 6. For the connection to the transformer 3, a digital signal multiplexer 18 which operates in a similar manner to the digital signal multiplexer 17 in the circuit 1 is provided in the circuit 2. Accordingly, the digital signal multiplexer 18 alternately sends signals to the secondary winding of the transformer 3 and receives signals from the secondary winding of the transformer 3 by time-division multiplex in a ping-pong process. The sending and receiving by the digital signal multiplexer 18 in each case takes place bit-serially. The serial bit stream to be sent or to be received is controlled by a frequency generator 14 which is connected to the digital signal multiplexer 18. The frequency generator 14, in turn, is connected to a crystal oscillator 15 which is arranged outside the circuit 2. The circuit 2 also exhibits a digital filter and control circuit 16 which is connected between the signal processing device 6 and the digital signal multiplexer 18. The digital filter and control circuit 16 effects pre-processing of the digital data to be sent to the transformer 3 or, respectively, to be received by the transformer 3. The digital filter and control circuit 16 is also clocked by the frequency generator 14 for this purpose.

At the end of the analog telephone line 5, a switch 9, for example in the form of a relay, which is operated by the circuit 1 by means of the digital signal multiplexer, is provided inside the circuit 1. This switch 9 can also be implemented by a transistor and can be integrated. The switch 9 connects the two a and b wires of the analog telephone line 5 to the circuit 8. The switch 9 is closed when the signal processing device 6 of the circuit 1 signals via the transformer 3 that a telephone connection is to be established. On the other hand, the ringing signal can be received by the circuit 1 via a separate line. The ringing signal is derived voltage-limited from the protection circuit 30 in order to signal an incoming request for connection to the circuit 1. The circuit 1 then causes the switch 9 to be closed.

The a and b wires of the telephone line 5 are also connected to a rectifier and charge regulating circuit 8 which is also controlled by the circuit 1. The circuit 8 rectifies the signals on the telephone line 5, on the one hand, in order to regulate the current through the a and b wires of the telephone line 5 in accordance with the rules of the respective network operator of the telephone line 5, on the other hand, in order to signal an off-hook or on-hook condition.

The circuit 1 receives its supply voltage from two winding taps on the primary winding of the transformer 3. These winding taps are connected via the diodes 12 and a capacitor 13 to an independent reference potential 11 of the circuit 1. The junction between diode 12, diode 31 and capacitor 13 is connected to a voltage regulating unit 10 in the circuit 1 which provides a regulated voltage to the remaining parts of the circuit 1. Alternatively, the voltage regulating unit 10 could be connected to the telephone line 5. Many network operators provide a limited power supply for the terminal connected to the subscriber line.

The transformer 3 ensures DC-decoupling between the telephone line 5 and the signal processing device 6. The special feature of the invention consists in that the transformer 3 is not directly connected to the a and b wires of the telephone line 5 but that the hybrid circuit 7 is interposed between the telephone line 5 and the transformer 3. The exchange of signals over the isolation barrier 4 takes place by means of high-speed bit streams in a ping-pong process. Due to the high frequency of the bit streams, a radio-frequency transformer can be used. The requirements for this transformer with respect to linearity and phase distortion can be lower than is the case with the known low-frequency transformers which are connected directly to the telephone line 5.

The circuit has its own reference potential 11 which is independent of a reference potential in the circuit 2 or in the signal processing device 6. The circuits 1 and 2 are preferably in each case integrated on one semiconductor chip. The rectifier and current regulating circuit 8, the protection circuit 30, the diodes 12, 31 and the capacitor 13 and parts of the circuit 10 are preferably discrete components which are connected to the circuit 1 designed as an integrated semiconductor circuit. Similarly, the crystal oscillator is a discrete component 15 which is connected to the circuit 2.

In addition, the digital signal multiplexer 17 in the circuit 1 exhibits a clock regeneration circuit in order to recover the clock generated by the frequency generator 14 in the circuit 2 and contained in the transmitted bit stream and provide it to the circuit sections there, especially the digital signal multiplexer 17, the analog/digital converter 19 and the digital/analog converter 20. At the same time, the rectified data clock can be used as power source by the circuit 1. Diodes 12, 31, capacitor 13 and the voltage regulating unit 10 are provided for this purpose.

FIG. 2 shows a second illustrative embodiment of the invention. Elements fulfilling a similar function to elements in the illustrative embodiment of FIG. 1 are in each case designated by the same reference symbols in FIGS. 1 and 2. Reference is, therefore, made to the discussions relating to the illustrative embodiment of FIG. 1 to obtain a more detailed explanation. In concept, the illustrative embodiment of FIG. 2 differs from that of FIG. 1 in that, instead of high-speed bit streams, analog radio-frequency signals are transmitted via the transformer 3. For this purpose, a modulator 23 which modulates the signal coming from the hybrid circuit 7 onto a radio-frequency carrier with the frequency RF1 is provided in the circuit 1. The carrier signal thus modulated is supplied to an analog signal mixer 21. In the reverse signal direction, a demodulator 25 which is driven with a radio-frequency carrier signal having the frequency RF2 is provided between the analog signal mixer 21 and the hybrid circuit 7. The analog signal mixer 21 sends the signal coming from the modulator 23 to the transformer 3 and receives the signal to be sent to the demodulator 25 from the transformer 3. In the preferred illustrative embodiment, the carrier frequencies RF1 and RF2 are spaced apart sufficiently so that there will be no beating of the modulated signals. In the analog signal mixer 21, the respective directions of transmission are separated from one another by transmit filters and receive filters.

Similarly, an analog signal mixer 22 which also exhibits a transmit filter and a receive filter is provided in the circuit 2 of FIG. 2. The signal received from the transformer 3, which has been modulated with the carrier frequency RF1 in the modulator 23, is demodulated with the aid of a demodulator 26 which is also operating at the carrier frequency RF1 in the circuit 2. In the transmit direction, a modulator 24 is provided which operates at the carrier frequency RF2. The output signal of the modulator 24 is supplied to the transformer 3 via the analog signal mixer 22. The analog signal mixer 21 in the circuit 1 receives this signal and supplies it to the demodulator 25 which demodulates it at the same carrier frequency RF2.

At the output of the demodulator 26, an analog/digital converter 27 which converts the received analog signal into a digital signal and supplies it to a digital filter and control circuit 29 is provided in the circuit 2. In the reverse direction, digital signals from the digital filter and control circuit 29 are supplied to a digital/analog converter 28 which supplies an analog transmit signal to the modulator 24.

In the illustrative embodiment of FIG. 2, a frequency-division multiplex method is used instead of the time-division multiplex method of FIG. 1 for transmitting bi-directional signals via the transformer 3. Since radio-frequency signals are transmitted via the transformer 3, the same requirements apply to the transformer 3 of FIG. 2 as for the transformer 3 of FIG. 1. In the illustrative embodiment of FIG. 2, the hybrid circuit 7 is connected between the transformer 3 and the telephone line 5 to implement the frequency-division multiplex method. The circuit 1 obtains its voltage supply from special taps on the primary winding of the transformer 3 via diodes 12, 31 and a capacitor 13. As in the illustrative embodiment of FIG. 1, the switch 9 is controlled completely within the circuit 1.

Both illustrative embodiments combine the advantages of low costs and a lower form factor compared with previous solutions. Since the circuit 1 is supplied with power via the transformer 3, no network-operator-oriented design of the circuit 1 is required. The circuit 1 is, therefore, also insensitive to interference and fluctuations of the direct voltage on the a and b wires of the telephone line 5. The switch 9 is preferably controlled in the circuit 1. The caller ID contained in an incoming request for connection can be determined by programming the digital filter and control circuit 16 and 29, respectively, in circuit 2 and transmitted to the signal processing device 6. Any interfering voltages which may be present on the analog telephone line 5 are suppressed by the proposed transmission techniques. As a result, a very high data rate can be achieved over the analog telephone line 5.

What is claimed is:

1. Device for the DC-decoupled connection of a telephone line to a digital signal processing device at the subscriber end of the telephone line, comprising a first circuit, which is connected to the telephone line;

a transformer;

a second circuit, which is connected to the digital signal processing device;

the first circuit exhibiting a hybrid circuit between the transformer and the telephone line for separating the signals of the telephone line in a first signal path which extends from the telephone line to the digital signal processing device, and into a second signal path which extends from the digital signal processing device to the telephone line;

the transformer having a first and a second winding;

the first winding being connected to the first circuit and the second winding being connected to the second circuit;

the first and second winding being DC-coupled from one another;

the first and second circuits transmitting the signals of the first and second signal paths transmitting bi-directionally by a ping-pong process decoupled via the transformer for both directions of transmission.

2. Device according to claim 1, characterized in that the first circuit in the first signal path exhibits an analog/digital converter which follows the hybrid circuit, and the first circuit in the second signal path exhibits a digital/analog converter which precedes the hybrid circuit.

3. Device according to claim 2, characterized in that the output of the analog/digital converter and the input of the digital/analog converter are connected to a first digital signal multiplexer which, in turn, is connected to the first winding of the transformer.

4. Device according to claim 3, characterized in that the signal multiplexer is operated in such a manner that the first and the second signal path are alternately connected to the transformer.

5. Device according to claim 4, characterized in that the second circuit exhibits a second digital signal multiplexer which is connected to the second winding of the transformer.

6. Device according to claim 5, characterized in that the second circuit exhibits an oscillator circuit which provides the clock for the second digital signal multiplexer.

7. Device according to claim 6, characterized in that the first digital signal multiplexer exhibits a clock recovery circuit which recovers the clock of the oscillator circuit and provides it to the first circuit.

* * * * *